(12) United States Patent
Bacquet et al.

(10) Patent No.: US 8,773,241 B2
(45) Date of Patent: Jul. 8, 2014

(54) DEVICE FOR THE SECURE CONTACTLESS DATA EXCHANGE BETWEEN A READER AND A CARD

(75) Inventors: Sylvain Bacquet, Chasselay (FR); Ricardo Malherbi Martins, Grenoble (FR); Jacques Reverdy, Crolles (FR); Elisabeth Crochon, Poisat (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 445 days.

(21) Appl. No.: 12/968,665

(22) Filed: Dec. 15, 2010

(65) Prior Publication Data

US 2011/0148588 A1    Jun. 23, 2011

(30) Foreign Application Priority Data

Dec. 21, 2009   (FR) ..................................... 09 59307

(51) Int. Cl.
  *H04Q 5/22*   (2006.01)
(52) U.S. Cl.
  USPC .... 340/10.1; 340/572.1; 340/571; 340/10.42; 340/10.41; 340/10.4
(58) Field of Classification Search
  USPC ............... 340/10.1, 572.1, 571, 10.42, 10.41, 340/10.4
  See application file for complete search history.

(56) References Cited

U.S. PATENT DOCUMENTS

| | | | | |
|---|---|---|---|---|
| 4,679,046 A | * | 7/1987 | Curtis et al. | 342/51 |
| 4,710,975 A | * | 12/1987 | Okamoto et al. | 455/276.1 |
| 5,103,192 A | * | 4/1992 | Sekine et al. | 331/1 A |
| 5,291,156 A | * | 3/1994 | Arntz | 333/20 |
| 5,847,622 A | * | 12/1998 | Chen | 332/103 |
| 5,963,173 A | * | 10/1999 | Lian et al. | 343/742 |
| 6,081,238 A | * | 6/2000 | Alicot | 343/742 |
| 6,937,136 B2 | * | 8/2005 | Greenwood et al. | 340/5.61 |
| 8,314,740 B2 | * | 11/2012 | Blumberg, Jr. | 343/741 |
| 2005/0117545 A1 | * | 6/2005 | Wittwer et al. | 370/332 |

(Continued)

FOREIGN PATENT DOCUMENTS

EP    1 256 904 A1    11/2002

OTHER PUBLICATIONS

European Search Report issued Apr. 8, 2011, in Patent Application No. EP 10 19 5700 (with English Translation of Category of Cited Documents).

*Primary Examiner* — George Bugg
*Assistant Examiner* — Naomi Small
(74) *Attorney, Agent, or Firm* — Oblon, Spivak, McClelland, Maier & Neustadt, L.L.P.

(57) ABSTRACT

A transponder of a contactless data exchange system includes a unit to receive and transmit data provided with at least one first antenna loop and at least one second antenna loop in order to carry out a coupling with a reader. The transponder includes a phase shifter to shift a signal coming from the second loop by a phase shift of $K*\pi$, K being an odd integer greater than 0, to produce a phase shifted signal. The transponder includes an adder, to add a signal coming from said first loop and the phase shifted signal to produce a sum signal. The transponder also includes a unit to authorize or prevent a data transmission, depending on the sum signal. A reader of a contactless data exchange system includes a data sending/receiving unit provided with at least one antenna loop, at least one other antenna loop, and a phase shifter.

9 Claims, 7 Drawing Sheets

(56) References Cited

U.S. PATENT DOCUMENTS

| | | | |
|---|---|---|---|
| 2005/0178822 A1* | 8/2005 | Siuta et al. | 235/379 |
| 2005/0237198 A1* | 10/2005 | Waldner et al. | 340/572.7 |
| 2006/0065714 A1* | 3/2006 | Jesme | 235/380 |
| 2006/0087406 A1* | 4/2006 | Willins et al. | 340/10.3 |
| 2006/0125598 A1* | 6/2006 | Fischer et al. | 340/3.4 |
| 2008/0001750 A1* | 1/2008 | Kurup | 340/572.1 |
| 2008/0180254 A1* | 7/2008 | Kajander | 340/572.7 |
| 2008/0210763 A1* | 9/2008 | Huot et al. | 235/492 |

\* cited by examiner

DEVICE FOR THE SECURE CONTACTLESS DATA EXCHANGE BETWEEN A READER AND A CARD

TECHNICAL FIELD

This invention relates to the field of contactless data exchanges, in particular that of systems of exchange between contactless cards and a reader such as provided for in RFID (RFID for "Radio Frequency Identification") or by the 14443 standard.

It implements an improved contactless card as well as a reader making it possible to read data on such a card and to carry out secure data exchanges.

PRIOR ART

The 14443 standard defines a type of transaction, between a reader, and a transponder, such as for example a card, or a ticket, or a label, placed in the electromagnetic field emitted by the reader.

The communications take place inductively between the reader and the transponder when the latter enters the coupling area with the reader.

The transactions can take place at a short distance, i.e. at a distance which is generally less than, or of a magnitude, of about ten centimeters.

In certain applications, confidential data exchanges between a reader and a card can be implemented. These data exchanges take place at the initiative of the reader, and do not require any particular action from the bearer of the card, except to place the latter in the electromagnetic field created by the reader.

Problems of intrusion in a card or of interception during a transaction between the reader and the card can occur.

"Skimming", in the field of RFID, designates the action of activating a contactless card in order to retrieve the confidential data therein, for example identification data, confidential code, data relative to a sum of money, by acting simulating a reader authorised to read this data.

This type of intrusion is possible in the case where the reader generates a sufficient field and adopts a communication protocol expected by the card.

"Eavesdropping" designates the action according to which an intruder uses a receiving device to intercept the communication between an authorised reader and a contactless card.

It is therefore necessary to secure the contactless link between a reader and a card.

Contactless cards are generally provided with a simple antenna in the form of a loop of rectangular or circular shape and can be activated by an unauthorised reader generating a sufficiently strong field coming sufficiently close.

EP 1 256 904 B1 discloses a contactless data exchange device comprising a contactless card reader having at least 2 antennas and a modulation circuit.

The device can implement a first modulation mode wherein the modulations of the antennas undergo a constructive interference by moving away from the reader and a second modulation mode wherein the modulations of the antennas undergo a destructive interference by moving away from the reader. This modulation is carried out by the difference in modulation between 2 antennas, which in what follows will be called the differential modulation.

This device further comprises a card having at least two antennas and a demodulation circuit.

The securing of the data contained in the card is not guaranteed, indeed, if the electromagnetic field of the spy reader radiates mostly on one of the loops of the antenna card, the differential modulation carried out by said card is done over two different levels of modulation.

In order to reduce the possibilities of intrusion in a card, a solution can be to reduce the size of the antennas of the card.

In this case, the relative position between the spy reader and the card would have to be very precise.

However, such a solution makes a transaction between an authorised reader and a contactless card more difficult.

There is the problem of finding a new improved system of contactless communication in terms of security of the transactions between a reader and a card.

DESCRIPTION OF THE INVENTION

The invention first relates to a transponder of a contactless data exchange system, comprising:
  a unit for receiving and transmitting data provided with at least one first antenna loop and at least one second antenna loop in order to carry out a coupling with a reader,
  means for authorising or preventing the data transmission according to the phase shift between a first signal received by said first loop and a second signal received by said second loop.

The first signal and the second signal can be carrier signals.

According to a first possibility of implementation, the means for authorising or preventing the data transmission can include:
  means for phase shifting, in order to introduce a given phase shift to a signal coming from the second loop,
  means for adding, in order to add a signal coming from the first loop and another signal coming from the second loop and coming from means for phase shifting.

The transponder can be powered by remote power feeding.

According to a possibility of implementation, the power can be created using a signal resulting from the sum between a signal coming from the first loop and a signal coming from the second loop and having undergone the given phase shift.

When the phase shift between the first signal received by the first loop and the second signal received by the second loop, is different by a predetermined phase shift, the transponder can be not powered or be under-powered.

"Under-powered" means that the power delivers a voltage that is insufficient to allow for one or several modules of the transponder to function, and in particular means for demodulating and/or charge modulators and/or at least one control logic unit of these means for charge modulating and/or a memory module.

The given phase shift can be a phase shift of $K*\pi$ (with K an odd integer greater than 0).

According to a second possibility of implementation, the means for authorising or preventing the data transmission can include: means for analysing phase shifts, to analyse the phase shift between a first signal received by the first loop and a second signal received by the second loop, a transmission of data being prevented consecutive to a detection by the means for analysing phase shifts of a phase shift that differs from a predetermined phase shift.

The transponder further comprises means for demodulating to demodulate signals coming from antenna loops.

The means for analysing phase shifts can be provided to generate an activation or deactivation signal of the means for demodulating according to the phase shift detected between the first signal and the second signal.

The first antenna loop and the second antenna loop respectively form a first resonant circuit of a given charge and a second resonant circuit of a given charge.

The transponder can further comprise:
first means for modulating in order to modulate the charge of the first resonant circuit and second means for modulating to modulate the charge of the second resonant circuit,
means for controlling able to control the first means for modulating and second means for modulating,
the transponder can be characterised in that consecutive to a detection by the means for analysing phase shifts of a phase shift that differs from a predetermined phase shift, the control of the modulation of the first resonant circuit and of the second resonant circuit is stopped.

According to a possibility of implementation of the antenna loops of the transponder, the first loop and the second loop can form a closed contour in the shape of an eight.

This possibility of implementation, makes it possible to limit the adding of bonding pads between the antenna and a chip comprising in particular the means for modulating and the means of control.

The first loop and the second loop can respectively form a first contour and a second contour separate from the first contour.

The first loop and the second loop can respectively form a first contour and a second contour, the first contour being located inside the second contour.

The invention also relates to a contactless reader, comprising a data sending/receiving unit provided with:
at least one first antenna loop and at least one second antenna loop in order to carry out a coupling with a transponder,
means for phase shifting, in order to introduce a predetermined phase shift between at least one signal emitted by said first antenna loop and at least one other signal emitted by said second antenna loop.

The phase shift can be a phase shift of $K*\pi$ (with K an odd integer greater than 0).

The invention also relates to a contactless data exchange system comprising a transponder such as defined hereinabove and a reader such as defined previously.

BRIEF DESCRIPTION OF THE DRAWINGS

This invention shall be better understood when reading the description of the example embodiments provided, purely for the purposes of information and in no way restrictive, in reference to the annexed drawings wherein.

Identical, similar or equivalent parts in the different figures bear the same numerical references in order to facilitate switching from one figure to another.

The various parts shown in the figures are not necessarily shown to a uniform scale, in order to make the figures easier to read.

DETAILED DESCRIPTION OF EMBODIMENTS OF THE INVENTION

Figure 1:
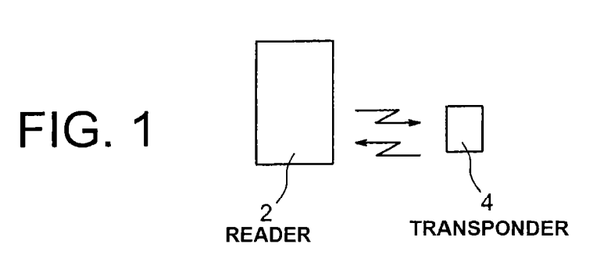
FIG. 1 shows a contactless data exchange system, reader-transponder.

In FIG. 1, a contactless data exchange system is shown diagrammatically comprising a reader 2, which exchanges radio-frequency magnetic signals with a transponder 4 via coupling.

The transponder can be, for example, in the form of a card.

These signals comprise information or data, and can also be used by the transponder in order to allow it to create its supply voltage, for example using a system for rectifying and filtering a sine-wave signal which constitutes a carrier.

These signals can further comprise clock data, or synchronisation data, in order to allow the transponder 4, to determine the rate at which the data or the information is transmitted.

The transponder 4 comprises a receiving and transmitting unit comprising antenna loops, for example at least two antenna loops.

Likewise, the reader 2 is provided with a sending/receiving unit comprising antenna loops, for example at least two antenna loops.

Figure 2A:
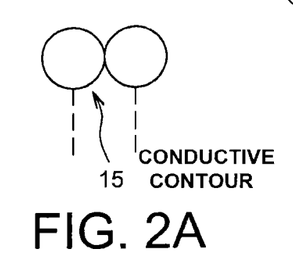
FIGS. 2A-2C show different antenna structures able to be implemented in a contactless data exchange system according to the invention.
Figure 2B:
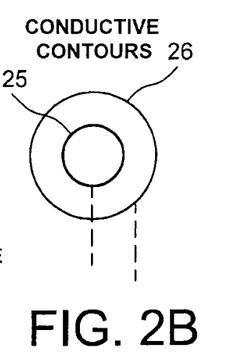

The antenna loops of the transponder 4 can be for example in the form of a conductive contour 15 in the shape of an eight (FIG. 2A), or juxtaposed separate conductive contours, for example of rectangular or circular shapes 35, 36, (FIG. 2C), or for example of at least one conductive contour 25 located in another conductive contour 26 (FIG. 2B).

In this latter case, the positioning precision of the transponder 4 in relation to reader 2 is less restrictive.

The central loop and the peripheral loop can be formed of wound conductive tracks made equivalent in active surface by a different number of turns of wound tracks.

Through the structure of this antenna, when one of the loops is plunged into the field, both loops are plunged into the field.

The shape as well as the number of antennas of the transmitting/receiving unit of the reader 2 can be variable.

Figure 2C:
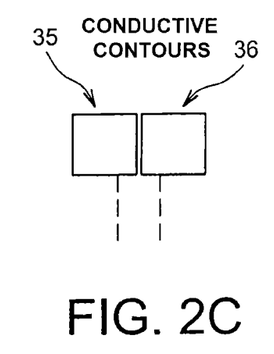

The reader 2 can comprise antenna loops for example such as those given in FIGS. 2A, 2B and 2C.

Figure 3A:
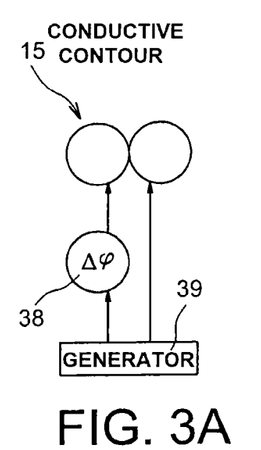
FIGS. 3A-3C show different antenna structures able to be implemented in a reader of an RFID system.
Figure 3B:
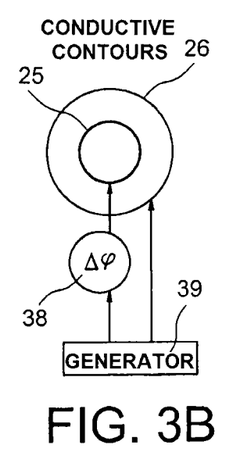
Figure 3C:
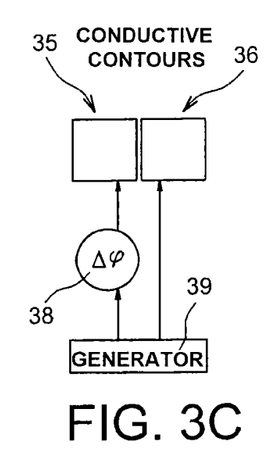

The transmitting/receiving unit of the reader 2 can comprise means forming a phase shifter 38 provided to apply a predetermined phase shift $\Delta\phi$ between a signal emitted by a given antenna loop among the antenna loops of the transmitting/receiving unit of the reader and another signal emitted by the other of the antenna loops, associated to said given loop, in particular carrier signals (FIGS. 3A-3C).

The phase shifter 38 can be carried out for example using a filter, which can be formed using passive components, or a delay line.

This phase shift constitutes a coding so that the transponder 4 receiving such signals, can authenticate the reader 2.

This phase shift can be for example a phase shift of $K*\pi$ (with K an odd integer greater than 0).

The reader 2 can as such be provided to emit signals in opposite phase between its two associated antenna loops.

The transmitting/receiving unit can also include a generator block 39 emitting a carrier for example at a frequency of 13.56 MHz.

The reader 2 comprises an oscillator and different modules carrying out for example functions of amplification, modulation which can be controlled by a logic circuit, as well as modules concerning the decoding of the information returned by a transponder, in particular modules carrying out functions of rectifying, filtering, amplification.

The transponder 4 can, according to a first possibility of implementation, comprise means for analysing phases provided to measure or detect a given predetermined phase shift between a carrier signal received by a given antenna loop of the transponder and another carrier signal received by another antenna loop, associated to said given loop.

The means for analysing phases can be carried out for example using means for sampling signals, means for determining the maximum between each signal and means for calculating the shift or the time between these maxima.

This measurement or detection of a given predetermined phase shift between the carrier signals received by the antenna loops of the transponder is used by the transponder 4 in order to allow it to authenticate the reader 2.

The transponder 4 can, for example, authenticate a reader by signals in opposite phase received on its associated antenna loops, i.e. by signals emitted in opposite phase by two associated antenna loops of the reader.

The phase shift analysis module can be associated to means provided to authorise or prevent an emission of data contained in the transponder by the latter.

For this, according to the result of the measurement or of the detection carried out by the phase shift analysis module, the retro-modulation of the carrier signal can be authorised or prevented in order to return or not return the data requested to the reader.

Figure 4A:
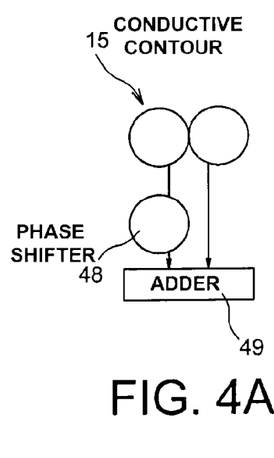
FIGS. 4A-4C show different antenna structures able to be implemented in an RFID system.
Figures 4B, 4C:
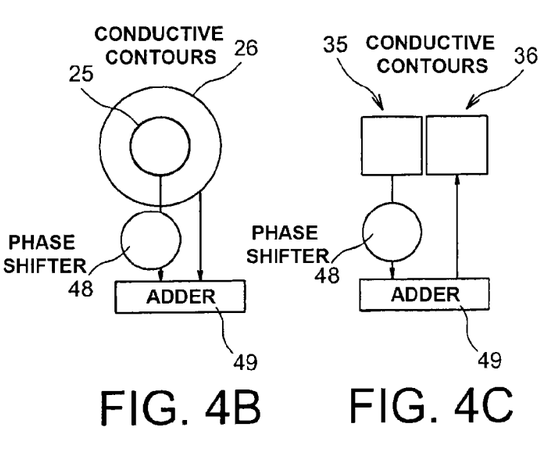

According to another possibility of implementation, the transponder 4 can comprise means 48 for introducing a phase shift between a signal received by a given antenna loop of the transponder and another signal received by another antenna loop, associated to said given loop, as well as means 49 for adding the signal coming from means for phase shifting and coming from one of the antenna loops, with the signal coming from the other antenna loop (FIGS. 4A-4C).

The result of this addition can make it possible to authorise the reader 2.

Data transmission to a reader can in this case, be prevented by depriving the transponder of power or by under-powering the transponder.

"Under-powering" means that the power delivers a voltage that is insufficient to allow the transponder to operate, in such a way that the latter cannot transmit data.

Figure 5A:
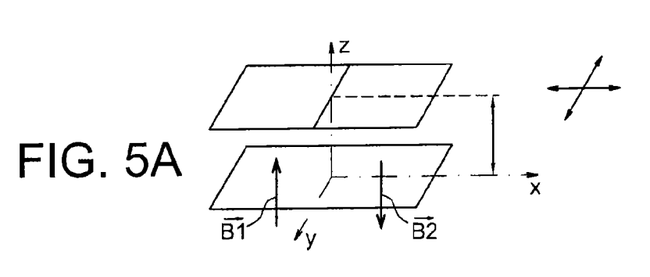
FIGS. 5A-5B show respectively a positioning of antennas of a reader according to the invention in relation to those of a transponder implemented according to the invention, and a positioning of antennas of a reader according to prior art and of a transponder implemented according to the invention.

In FIG. 5A, the respective antenna loops of a reader according to the invention and of a transponder such as implemented according to the invention, are shown.

The magnetic fields B1, B2, emitted by the antennas of the reader are in opposite phase in such a way that the transponder can, by analysing the phase difference of the signals received on its antenna loops, allow the transponder to identify the reader as authorised to read the data that it contains.

Figure 5B:
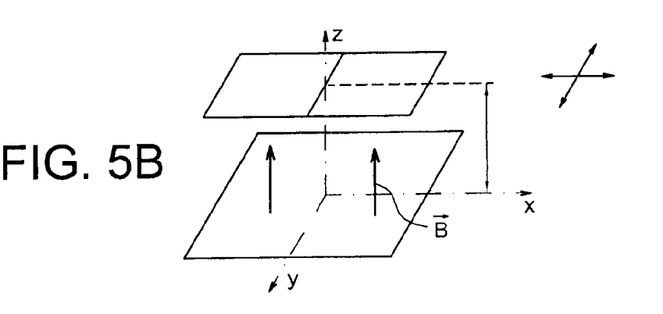

In FIG. 5B, the antenna loop of a reader according to prior art and of a transponder such as implemented according to the invention, are shown.

The reader emits, in this example, a homogeneous magnetic field B.

The transponder can, by analysing the phase difference of the signals received on its antenna loops, identify a reader, as unauthorised to read the data that it contains or not authorised to read all of the data that it contains, in particular not authorised to read its confidential data.

The reader and the transponder can each include more than two associated conductive loops.

Figure 6:
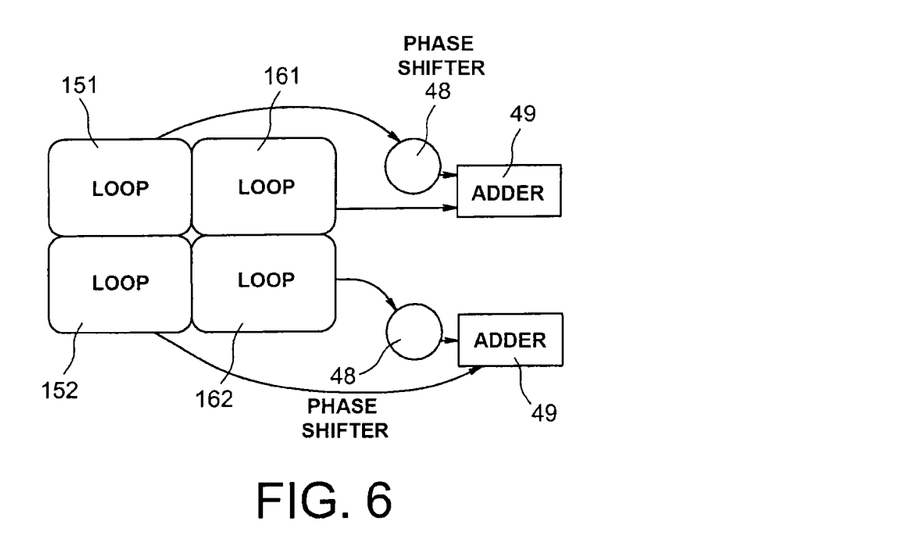
FIG. 6 shows a receiving and response unit with 4 antenna loops in a transponder implemented according to the invention.

In the example of the device in FIG. 6, 4 loops 151, 152, 161, 162 of antennas of a transponder are shown.

The loops 151 and 161 are associated together, while the loops 152 and 162 are also associated together in such a way that the phase difference of the signal emitted by the loop 151 and of the signal emitted by the loop 161 are compared, and the phase difference between the signal emitted by the loop 152 and the signal emitted by the loop 162.

Simulations carried out on this antenna show the distribution of the averaged field on an antenna of dimensions 25 mm×15 mm.

Figure 7:
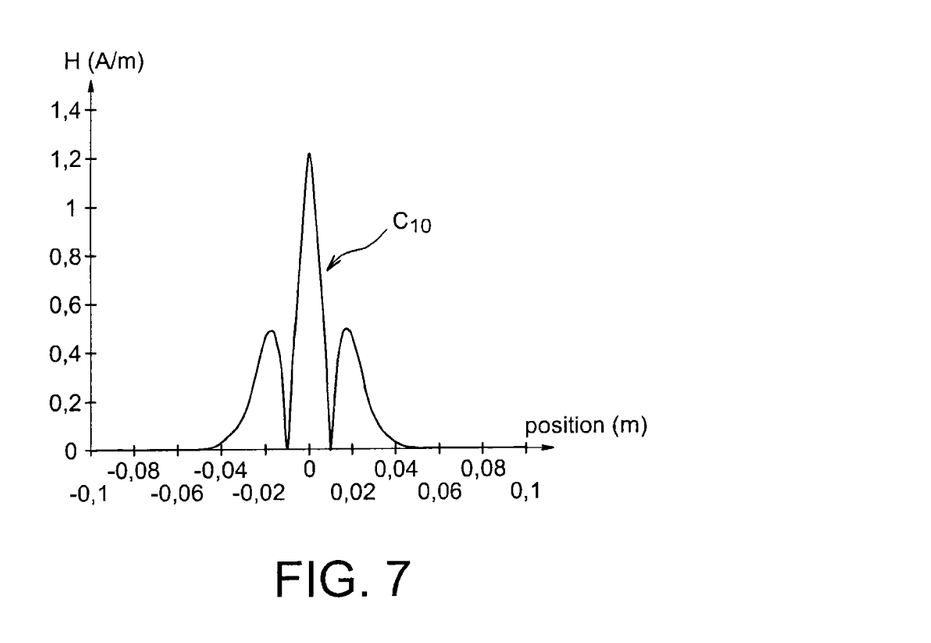
FIGS. 7 and 8 show operating modes of a contactless data exchange system between a reader and a transponder according to the invention.

The curve $C_{50}$ in FIG. 7 shows than an activation of the card with the antenna is possible with a positioning precision of 2 cm, and with an identical reader antenna.

Figure 8:
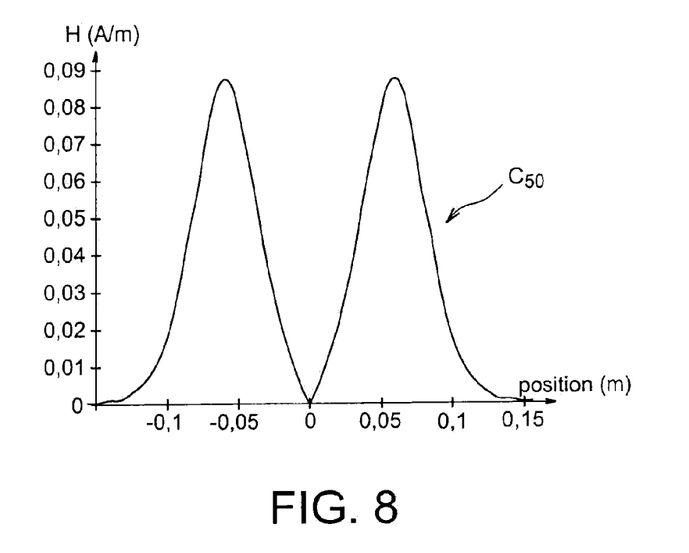

With the same card placed in the magnetic field of an antenna of an unauthorised reader, the level of the field on the surface of the antenna card is much weaker (curve $C_{50}$ in FIG. 8).

Two operating modes can be implemented in a contactless data exchange system such as implemented according to the invention.

A first mode called "permanent secure mode", wherein the transponder can transmit the data that is contains only in the presence of a reader that it recognises as an authorised reader through the specific phase shift of the signals coming from the reader that the transponder detected on its associated antenna loops.

In this first mode, the transponder does not transmit any data, when it detects an unauthorised reader.

An unauthorised reader can be a reader 2 according to prior art, which emits a homogeneous field in such a way that the analyse of the phase shift carried out by the transponder 4 indicates a phase shift that differs from that expected by the latter.

Figure 9A:
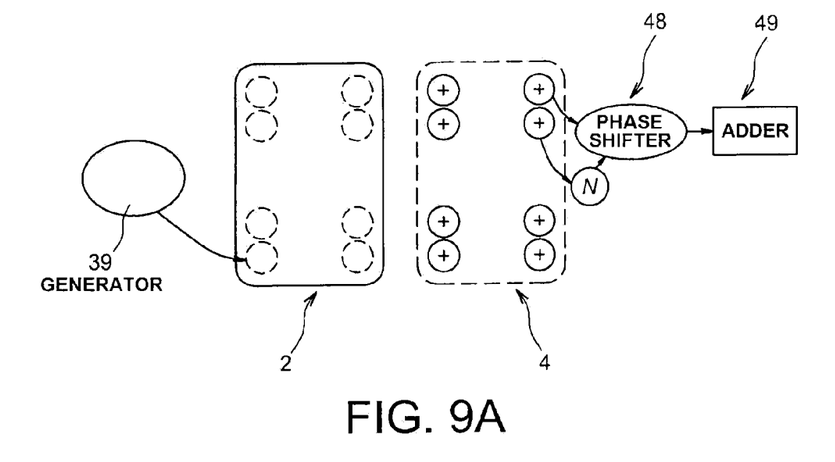
FIGS. 9A-9B show an operating example of a data exchange system according to the invention.

A second mode, called "extended secure mode", allows the transponder 4 to operate with a reader 2 according to prior art not having any specific configuration, to transmit data of a non-confidential nature, when the transponder does not recognise it as an authorised reader through the phase shift of the signals coming from this reader (FIG. 9A).

Figure 9B:
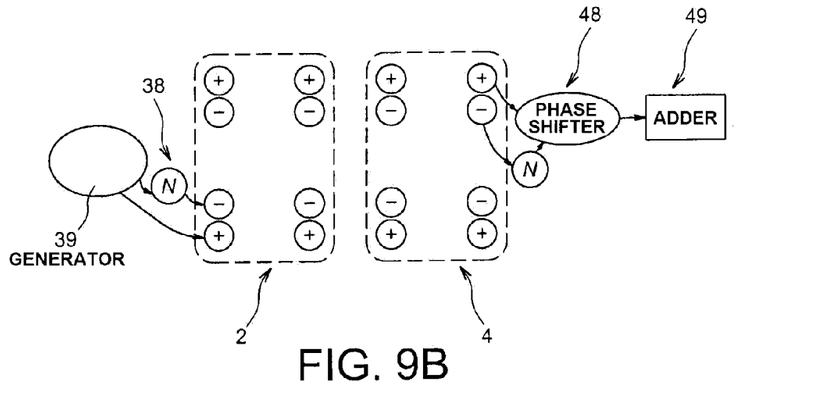

In this second mode, the transponder can also transmit data of a confidential nature, when the transponder recognises it as an authorised reader through the analysis of the phase shift of signals coming from this reader 2 that the transponder 4 detected on its associated antenna loops (FIG. 9B).

Figure 10A:
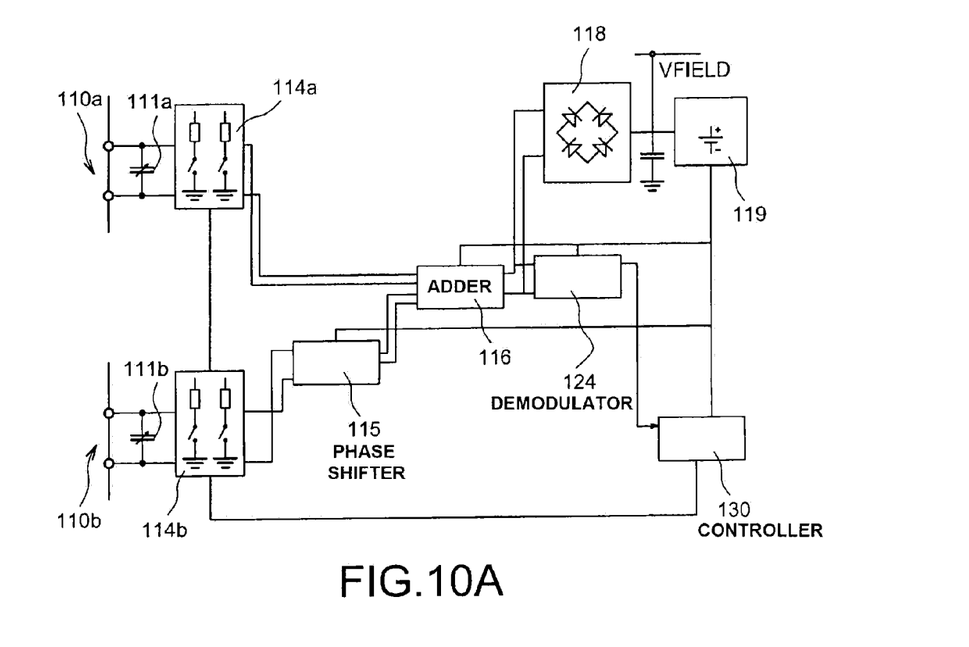
FIGS. 10A-10B show respectively a first example of a transponder structure according to the invention, and a second example of a transponder according to the invention.

A first detailed example of the implementation of a transponder device according to the invention is provided in FIG. 10A.

The transponder comprises a first resonant circuit 110a comprising a first capacitance 111a, connected to a first inductive antenna loop, and a resonant circuit 110b comprising a second capacitance 111b, connected to a second inductive antenna loop, the antenna loops 110a, 110b forming for example one or the other of the structures described previously in liaison with FIGS. 2A-2C.

Means for modulating 114a are provided to modulate the load of the first resonant circuit 110a, while means for modulating 114b make it possible to modulate the charge of the second resonant circuit 110b.

The means for modulating 114a, 114b are controlled by a control logic unit 130.

At the output of the second resonant circuit 110b can be provided a phase shifting stage 115, in order to apply a given phase shift to the signal coming from the second resonant circuit 110b, for example in order to apply a phase shift of n. The phase shifting stage 115 can be implemented, for example, using delay lines.

An adding stage 116 is provided at the output of the first resonant circuit 110a and of the phase shifting stage 115, in order to carry out an addition between a signal coming from the first antenna loop and a signal coming from the second antenna loop and which was phase shifted by n by the stage 115.

A voltage rectifier 118 is provided at the output of the adding stage 116 and provides a conversion from alternating current to direct current.

At the output of the voltage rectifier 118, a voltage regulator 119 can also be provided.

The power of the transponder is generated using signals coming from the reader 2. In this example, according to the invention, the power of the transponder is as such created using the signal coming from the adder 116, in such a way that when the signal coming from the adder 116 is null or less than a given threshold, the transponder is not powered or is insufficiently powered.

"Insufficiently powered" means that the power created using the signal coming from the adder 116 implements a voltage that is insufficient to allow in particular the control logic unit to operate, and therefore the means for modulating 114a, 114b to modulate the load of the resonant circuits, as well as to be able to access a memory block of the transponder.

A demodulator stage 124 is also provided at the output of the adder 116. When the demodulator stage 124 is insufficiently powered, the demodulation of the control of the reader is also prevented.

The transponder further comprises at least one memory block (not shown in FIG. 10A) comprising data to be transmitted.

Figure 10B:
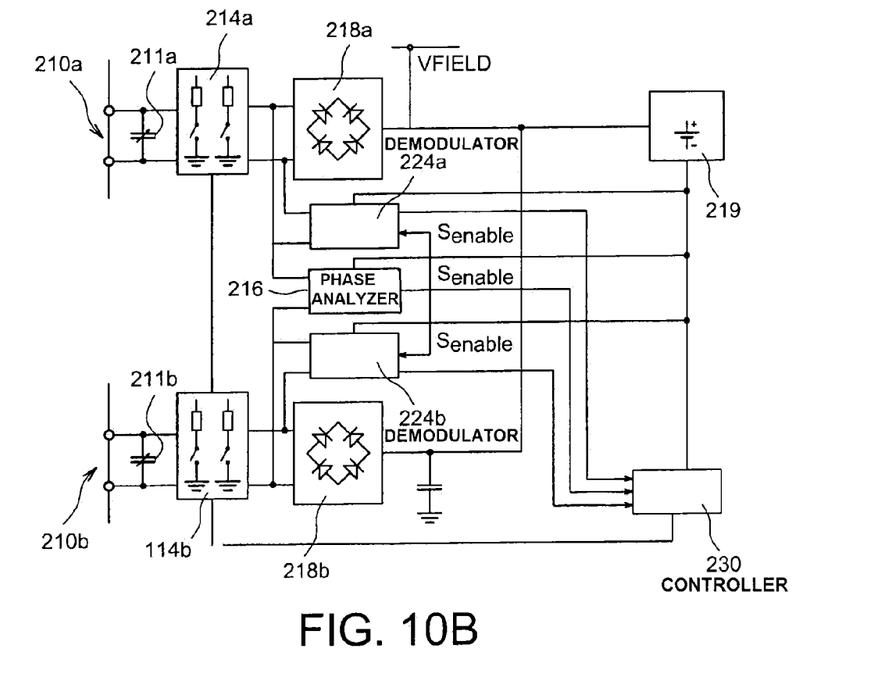

A second example of a transponder device is provided in FIG. 10B, and comprises a first resonant circuit 210a comprising a first capacitance 211a connected in parallel to a first inductive antenna loop, and a second resonant circuit 210b comprising a second capacitance 211b, connected in parallel to a second antenna loop, separate from the first inductive loop the antenna loops having for example a shape such as on the structure in FIG. 2B or in FIG. 2C.

The first resonant circuit 210a and the second resonant circuit 210b are associated respectively to means for modulating 214a, and means for modulating 214b.

The means for modulating 214a are provided to modulate the load of the first resonant circuit 210a, according to signals delivered by a logic control circuit 230.

The means for modulating 214b are provided to modulate the load of the second resonant circuit 210b, according to signals delivered by the logic control circuit 230.

A voltage rectifier 218a is provided at the terminals of the antenna 210a, while another voltage rectifier 218b is provided at the terminals of the other antenna 210b. A voltage regulator 219 is provided at the output of the voltage rectifiers 218a, 218b.

In this example, the transponder comprises a phase analysing stage 216 provided at the output of the resonant circuits 211a, 211b, in order to analyse the phase shift between a signal coming from the first resonant circuit 210a and a signal coming from the second resonant circuit 210b.

According to the phase shift detected by the phase analyser 216, the latter is able to deliver or not deliver a $S_{enable}$ activation signal to the demodulators 224a, 224b. This $S_{enable}$ activation signal can also be intended for the control unit 230.

A first demodulator 224a is connected to the first resonant circuit 210a, while another demodulator 224b is connected to the second resonant circuit 210b.

When the means for analysing phase shifts detect a phase shift that differs from a predetermined phase shift, the demodulators 224a, 224b are deactivated or are not activated.

In this case, the control logic unit 230, does not receive signals coming from demodulators 224a, 224b and does not transmit any control signal to the means for modulating 214a, 214b.

When the means for analysing phase shifts detect a phase shift equal to the predetermined phase shift, for example a phase shift of $K*\pi$ (with K an odd integer greater than 0), the demodulators 224a, 224b are activated using the $S_{enable}$ signal, in such a way that the signals coming from resonant circuits 210a, 210b can be demodulated and transmitted to the logic control circuit 230, which controls the means for modulating 214a, 214b.

Figure 11:
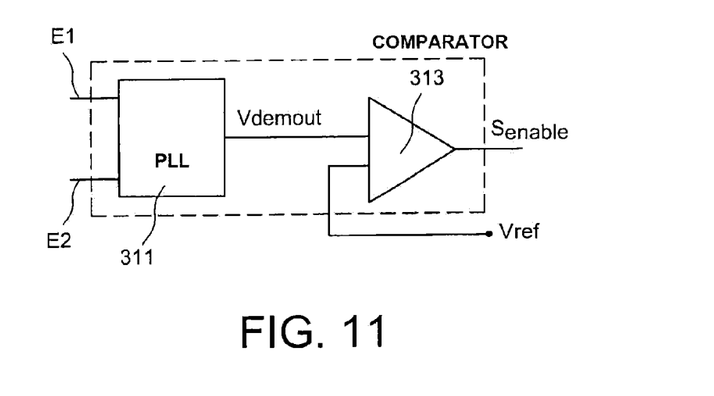
FIG. 11 shows an example structure of means for analysing phases according to the invention.

An example of implementation of the phase shift analysis module is provided in FIG. 11, and comprises a block 311, for example a PLL component (PLL for "phase locked loop") provided to deliver a Vdemout output signal of which the amplitude and the phase depend on the phase difference ($\phi 2-\phi 1$) between its inputs E2 and E1.

The Vdemout output signal can then be compared using means of comparing 313 to a reference signal Vref, fixed according to a predetermined phase shift for which it is desired that the means for analysing phase shifts emit an acknowledgement signal.

According to a possibility of implementation, the means of comparing 313 can be replaced with means making it possible to generate a $S_{enable}$ signal when Vdemout is equal to vref, at roughly a hysteresis, for example by having two hysteresis comparators, with for example an inverter and a non-inverter and by carrying out a logic AND combination of the 2 outputs of these comparators.

The transponder also comprises at least one memory block (not shown in FIG. 10B) comprising data to be transmitted.

In this example embodiment, the transponder is capable of distinguishing a spy reader from an authorised reader through the phases analysis of the signals received using means for analysing phases 216.

Figure 12:
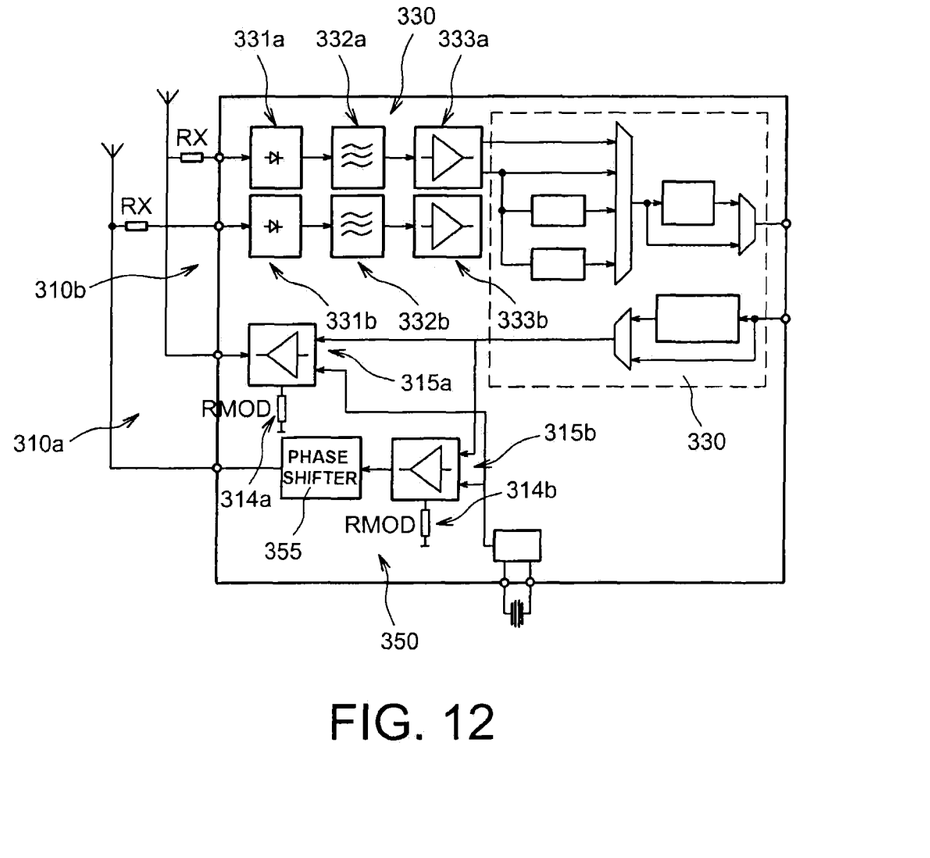
FIG. 12 shows an example structure of a reader according to the invention.

An example implementation of a reader is provided in FIG. 12.

In this example, the reader comprises a first antenna circuit 310a and a second antenna circuit 310b, provided to emit out-of-phase signals, according to a predetermined phase shift intended to make it possible to authenticate this reader.

The reader can then be provided with means for phase shifting 355, in order to introduce a predetermined phase shift to signals coming from the sending unit 350 of the reader.

The sending unit 350 of the reader can also be provided with means of amplifying 315a, 315b, and of modulating 314a, 314b.

The receiving unit 330 of the reader can be provided with rectifying 331a, 331b, filtering 332a, 332b, amplification 333a, 333b stages.

According to a possibility a transponder according to the invention can be implemented in such a way that it can be placed in a non-secure mode. In this case the transponder authorises all of the readers to read the non-secure information.

A switch from the non-secure mode to a secure mode will be requested of the card by a specific command.

Following the reception of this command, the transponder analyses the signals on its various antenna loops.

An authorised reader requests that the transponder send back to it the secure data that it needs.

Only a reader emitting out-of-phase signals according to a predetermined phase shift that can be detected by the transponder will be able to read the secure data.

The invention claimed is:

1. A transponder of a contactless data exchange system, comprising:
    a unit to receive and transmit data provided with at least one first antenna loop and at least one second antenna loop in order to carry out a coupling with a reader;
    a phase shifter to shift a signal coming from the second loop by a phase shift of $K*\pi$, K being an odd integer greater than 0, to produce a phase shifted signal;
    an adder, to add a signal coming from said first loop and the phase shifted signal to produce a sum signal; and
    a unit to authorize or prevent a data transmission, depending on the sum signal.

2. A transponder of a contactless data exchange system according to claim 1, wherein when the sum signal lies under a given threshold the transponder is not powered or is underpowered.

3. A transponder of a contactless data exchange system comprising:
    a unit to receive and transmit data provided with at least one first antenna loop and at least one second antenna loop in order to carry out a coupling with a reader;
    a unit to authorize or prevent a data transmission comprising:
        a phase shift analyzer, to analyze a phase shift between a first signal received by the first loop and a second signal received by the second loop, a transmission of data being prevented consecutive to a detection by the phase shift analyzer of a phase shift that differs from a predetermined phase shift of $K*\pi$, K being an odd integer greater than 0.

4. A transponder of a contactless data exchange system according to claim 3, wherein the transponder further comprises a demodulator, the phase shift analyzer being provided to emit an activation or deactivation signal of the demodulator according to the phase shift detected between the first signal and the second signal.

5. A transponder of a contactless data exchange system according to one of claims 1, 2, and 3, wherein the first antenna loop and the second antenna loop respectively form a first resonant circuit of a given charge and a second resonant circuit of a given charge, the transponder comprising:
    a first modulator to modulate the load of the first resonant circuit and a second modulator to modulate the load of the second resonant circuit,
    a controller to control the first modulator and the second modulator, the modulation of the first resonant circuit and of the second resonant circuit being stopped when the added signal lies under a given threshold.

6. A transponder according to one of claims 1, 2, and 3, the first loop and the second loop forming a closed contour in the shape of an eight.

7. A transponder according to claim 6, the first loop and the second loop respectively forming a first contour and a second contour separate from the first contour.

8. A transponder according to claim 7, the first loop and the second loop respectively forming a first contour and a second contour, the first contour being located inside the second contour.

9. A contactless data exchange system, comprising:
    a transponder according to claim 1 or 3, and
    a reader of the contactless data exchange system, comprising a data sending/receiving unit provided with:
        at least one antenna loop and at least one other antenna loop in order to carry out a coupling with a transponder,
        a phase shifter, to introduce a predetermined phase shift between at least one signal emitted by said antenna loop and at least one other signal emitted by said other antenna loop, said phase shift being equal to $K*\pi$ where K is an odd integer greater than 0.

* * * * *